Dec. 1, 1953 — W. L. MORRISON — 2,660,809
APPARATUS FOR COMPOSTING ANIMAL MANURE
Filed June 23, 1951
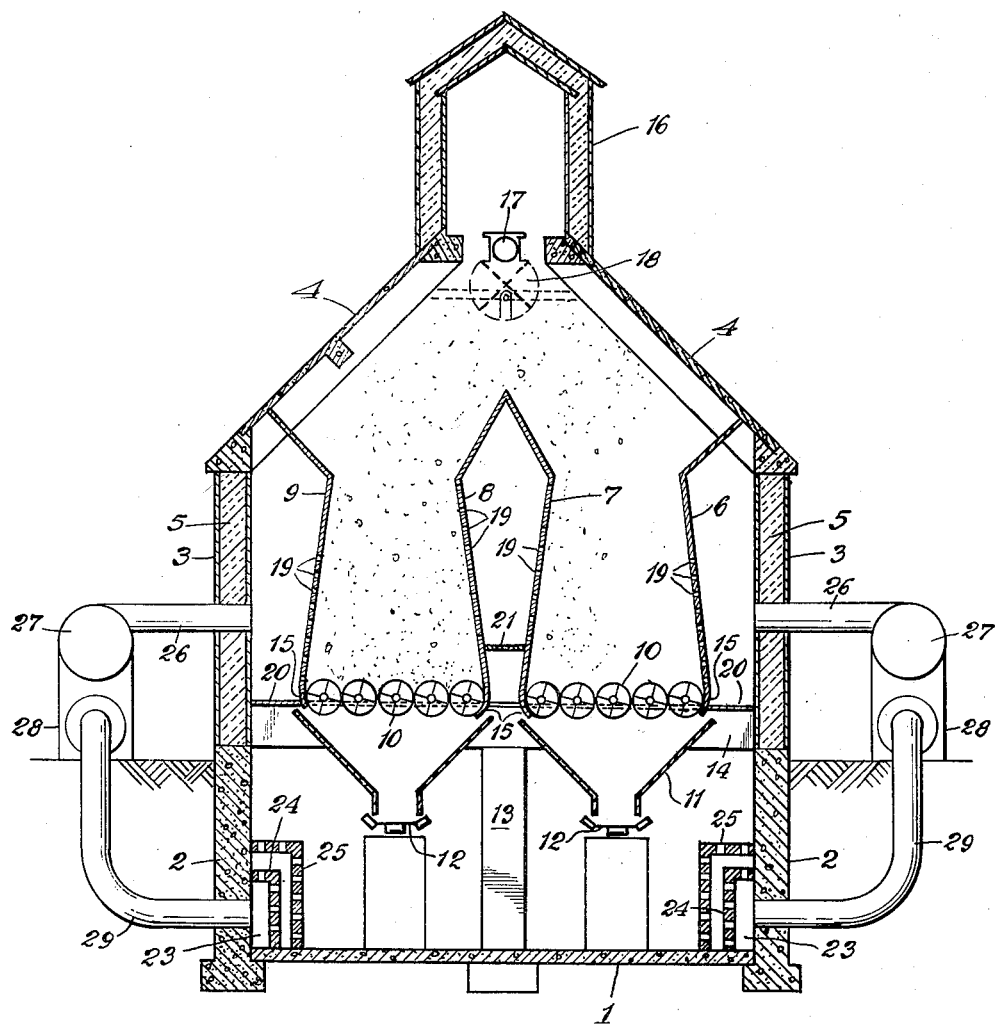
INVENTOR.
Willard L. Morrison
BY
Parker & Carter
Attorneys Patented Dec. 1, 1953

2,660,809

UNITED STATES PATENT OFFICE 2,660,809

APPARATUS FOR COMPOSTING ANIMAL MANURE

Willard L. Morrison, Lake Forest, Ill., assignor to Union Stock Yards & Transit Company, Chicago, Ill., a corporation of Illinois Application June 23, 1951, Serial No. 233,138

3 Claims. (Cl. 34—169)

My invention relates to improvements in apparatus for composting animal manure and has for one object to provide an apparatus wherein large quantities of miscellaneous animal manure such as originate in stock yards or the like may be continuously composted or digested at maximum speed and minimum cost.

Composting manure requires for best operation, substantially continuous circulation of air, the temperature and moisture content of which is accurately controlled through the composting mass, the continuous addition to one side of the mass of raw manure and continuous withdrawal from the other side of the mass of composted manure.

Preferably I maintain a permanent mass of manure in a generally vertical column. I propose to pass air through the column generally along paths inclined to or perpendicular to the vertical to allow the mass to move downwardly as it is composted and to continuously or periodically as the case may be withdraw from the bottom of the mass composted manure while at the same time adding to the top of the mass raw manure so that raw manure gradually passes down as the mass moves downwardly coming first to the zone where composting takes place, later migrating downwardly to the zone where if necessary the drying takes place and then to the discharge zone, the discharged material being continuously replaced by material from above.

There is a limit to the thickness of the mass through which moist, temperature controlled air may economically be passed. It is important that temperatures of the air and of the composting mass be controlled within ranges suitable to the life and propagation of the bacteria or microbia which accomplish the composting. By the preferred arrangement I propose to force air upwardly through the bottom of the mass and to withdraw the air laterally from the sides of the mass below the zone in which the raw manure is found. Thus at any state in the operation a vertical cross section through the mass will show raw manure at the top, manure in various stages of composting as you go down until at the bottom of the mass where manure is about to be discharged, you have finished composted manure.

The raw manure at the top of the mass serves as an insulator for the upper layers of the composting mass so that the temperature of the ambient air has little if any effect on the process. The discharge passages on both sides of the mass insulate the mass from the ambient air and the air passages through which the air is supplied to the bottom of the mass insulate at that point. Thus the temperature and moisture characteristic of the mass may be maintained constant or perhaps better to say controlled by the control of the temperature of the air admitted to the mass. Under some circumstances it will be desirable periodically to pass through the mass substantially completely dry air for the purpose of drying the lower portion of the mass before discharge. Immediately thereafter the air will again be supplied in moist condition to promote further digestion. Under some circumstances it will be possible to provide a continuous supply and continuous discharge. Under other circumstances supply and discharge will be periodic independent of atmospheric conditions, the type of manure and the rate of output desired.

My invention is illustrated more or less diagrammatically in the accompanying drawing wherein 1 is the floor, 2 the foundation walls, 3 the insulated super structure walls, 4 the roof of a composting house, the lower portion of the house being sunk in the ground, the upper portion of the house walls 3 being insulated as indicated at 5. The roof 4 needs no insulation. Within the house are a plurality of walls 6, 7, 8 and 9 which define two parallel bins to receive the manure. These bins are open-bottomed but are floored by rotatable paddles or grate bars 10, means being provided for rotating them in unison so that in effect the floor of the bin is like the grate in a furnace. Rotation of the paddles in unison will discharge material from the bottom of the mass downwardly from the bottom of the bin into troughs 11. Below these troughs 11 are belt conveyors 12 which receive the composted manure released or fed out by the grate bars 10 and convey the manure to any suitable point not here shown.

13 indicates a column which carried a beam 14 extending across the house to support the troughs 11, there being of course a plurality of such columns and beams, the troughs 11 being supported at each end thereon. The walls 6, 7, 8 and 9 have curved lower extensions 15 conforming to the paddles so as to permit the paddles to rotate while forming a housing therefor. 16 is a clerestory supported on the roof panels 4 containing a conveyor diagrammatically illustrated at 17 with suitable gating means 18, the details of which form no part of the present invention whereby manure supplied from any suitable source may be moved longitudinally of the clerestory and dropped downwardly into the chamber defined between the walls 3, roof 4 and clerestory 16 and into the bins defined between the walls 6, 7, 8 and 9. The walls 6, 7, 8, 9, are perforate as indicated at 19. The space between the walls 3 and 6, 7 and 8 and 9 and 13 in each case defines a suction chamber closed at the bottom by the partition walls 20 and 21. At their lower boundaries the walls 7 and 8 are imperforate. The walls 6 and 9 are perforate just at their lower boundaries. The perforations in the walls 7, 8 extend to the top of the walls. The perforations in the walls 9 and 6 terminate below the top of the wall. The walls converge in each bin, that is—the walls 6 and 7 are closer together at the top than at the bottom and the walls 8 and 9 are closer together at the top than they are at the bottom. The reason is that it is important to avoid any bridging of the composted manure in the composting bins. If the walls are parallel and if the chamber is narrow enough so as to make possible adequate travel of air through the mass, there is danger of bridging. Bridging can be avoided by making the bin wider. When that is done air circulation suffers. Therefore I propose to avoid bridging by this inclination of the walls so that as the mass moves downwardly, it spreads out laterally and the inclined walls furnish no toehold for bridging.

The space below the vertical partitions 20 and 21 is supplied with air under pressure from any suitable source of power. That air is heated and its moisture content is controlled. The means for compressing the air for heating it and for forming its moisture content form no part of the present invention and are only illustrated diagrammatically. The chambers between the walls 6, 7, 8, 9 and 3 are connected to the suction side of the air compression means and furnish the supply of air so that the air may be circulated continuously through the system. Means for supplying additional air or for withdrawing air from the system form no part of the invention and so they are not illustrated. Air under pressure passes up through the bottom of the mass through the open grid formed by the paddle wheels 18 into the mass of manure, passes out through the perforations 19 in the walls 6, 7, 8 and 9 and is circulated through the system. The perforations in the walls thus are so spaced from the grid or floor that air passes through the manure at a more rapid rate the nearer the manure is to the discharge floor but experience shows that there is some air movement through the mass clear up to the top of the perforate zone of the walls 6, 7, 8 and 9. It will be remembered that the pressure beneath the mass and in the mass is above atmospheric. The clerestory is open to the ambient air. The manure more or less filling the area below the clerestory and above the composting vats or chambers offers substantial obstruction to air movement but does not completely prevent air movement so that there is a decreased zone of pressure upwardly through the mass and some air, enough to promote the incipient stages of composting is free to circuate through the mass well up toward the top of the chamber.

The air passages 23 are connected to the source of air under pressure and the double set of perforate walls 24, 25 are provided to distribute air in the chamber below the paddles so as to maintain substantially constant air pressure and substantially constant moisture content and water in the air throughout the entire lower portion of the composting chamber.

I have shown a single chamber containing two composting cells or vats. Obviously if the chamber were smaller, a single vat or cell could be provided or if the chamber were wider, a plurality of cells. The point is that there is a definite limit to the effective width of the vertical mass of composted manure if there is to be adequate circulation from the bottom of the mass for discharge through the sides of the mass. There will not be sufficient air circulation to support adequate composting if the air is withdrawn only from the top of the mass and if that were the case, it would be necessary to provide closures to be opened only when manure was being added. By the arrangement shown, the upper layer of the mass may be open to the ambient air at all times. Air lock must be provided in connection with the conveying means for withdrawing the composting manure from the pressure chamber below the mass but that is a much simpler proposition and one common to the art than would be the provision of an air lock for the supply of the raw manure. The air then passes vertically through the grid defined by the paddles 18 and laterally to the right and to the left for discharge through the side walls of the cell, thereby insuring a passage through the lower portion of the mass of a sufficient amount of air and moisture at a proper temperature to promote composting.

Air is drawn from the chambers on both sides of the composting mass through the ducts 26 to moisture and heat controlling blowers 27 by air chambers 28 which discharge through ducts 29 into the space 23. I have not shown the connection for the chamber between the walls 7 and 8 as it would be at the end of the building. The particular means for operating the air pumps or blowers or particular means for heating or moistening or the mechanism of the pumps form no part of the invention and are therefore shown quite diagrammatically.

I claim:

1. Means for composting animal manure and the like comprising a cell having a movable grate-like air pervious floor, and perforate walls extending upwardly above the floor and generally uniformly inwardly inclined, a feed hopper above the cell having its discharge mouth coextensive with the upper cross sectional area of the cell, its cross sectional area increasing upwardly, and exposed to ambient air pressure, a pressure plenum chamber in communication with the cell through the floor thereof, a suction plenum chamber in communication with the cell through the perforate walls, means for compressing air, a discharge conduit leading from the discharge side of said means to the pressure chamber, a suction conduit leading from the suction side of the pressure means to the suction chamber.

2. Means for composting animal manure and the like comprising a cell open to atmosphere at the top, a movable, grate-like, air pervious, floor closing the bottom thereof, the walls of the cell being apertured, a pressure chamber communicating with the cell through the air pervious floor, a suction chamber communicating with the cell through the perforate walls, air compressing means, a duct joining the pressure side of the air compressing means and the pressure chamber, a duct joining the suction side of the air compressing means and the suction chamber, means for filling the cell with animal manure and the like for composting.

3. Means for composting animal manure and the like comprising a cell open to atmosphere at the top, a movable, grate-like, air pervious, floor closing the bottom thereof, the walls of the cell being uniformly inwardly inclined from bottom to top, the floor extending across the entire open bottom of the cell, the walls of the cell being apertured, a pressure chamber communicating with the cell through the air pervious floor, a suction chamber communicating with the cell through the perforate walls, air compressing means, a duct joining the pressure side of the air compressing means and the pressure chamber, a duct joining the suction side of the air compressing means and the suction chamber, means for filling the cell with animal manure and the like for composting.

WILLARD L. MORRISON.

References Cited in the file of this patent

UNITED STATES PATENTS

| Number | Name | Date |
|---|---|---|
| 691,209 | Tweedale et al. | Jan. 14, 1902 |
| 1,669,012 | Nordstrom | May 8, 1928 |
| 2,148,946 | Hubmann et al. | Feb. 28, 1939 |
| 2,474,833 | Eweson | July 5, 1949 |
| 2,490,097 | Seaman et al. | Dec. 6, 1949 |